(12) United States Patent
Wilkinson et al.

(10) Patent No.: US 8,056,889 B2
(45) Date of Patent: Nov. 15, 2011

(54) POSITIONING DEVICE FOR THE FABRICATION OF COMPRESSOR IMPELLERS

(75) Inventors: Timothy J. Wilkinson, Jeannette, PA (US); Kent W. Beedon, Greensburg, PA (US)

(73) Assignee: Elliott Company, Jeannette, PA (US)

( * ) Notice: Subject to any disclaimer, the term of this patent is extended or adjusted under 35 U.S.C. 154(b) by 1006 days.

(21) Appl. No.: 11/658,281

(22) PCT Filed: Jul. 27, 2005

(86) PCT No.: PCT/US2005/026863
§ 371 (c)(1),
(2), (4) Date: Dec. 12, 2007

(87) PCT Pub. No.: WO2006/015156
PCT Pub. Date: Feb. 9, 2006

(65) Prior Publication Data
US 2008/0246204 A1    Oct. 9, 2008

Related U.S. Application Data

(60) Provisional application No. 60/592,281, filed on Jul. 29, 2004.

(51) Int. Cl.
*B25B 1/22* (2006.01)
(52) U.S. Cl. ............ 269/71; 269/95; 269/136; 29/281.1
(58) Field of Classification Search .............. 269/71–75, 269/95, 136–138; 29/288, 281.1
See application file for complete search history.

(56) References Cited

U.S. PATENT DOCUMENTS

| | | | |
|---|---|---|---|
| 2,106,525 A * | 1/1938 | Henry | 269/70 |
| 2,835,964 A | 5/1958 | Yarwood | |
| 3,031,566 A | 4/1962 | Wuesthoff | |
| 3,066,805 A * | 12/1962 | Sullivan | 414/728 |
| 3,306,601 A | 2/1967 | Mitchell | |
| 3,328,555 A | 6/1967 | Dinter | |
| 3,543,989 A | 12/1970 | Cooper | |
| 3,665,148 A | 5/1972 | Yasenchak et al. | |
| 3,821,498 A * | 6/1974 | Schaefer, Jr. et al. | 200/18 |
| 4,294,440 A * | 10/1981 | Severt | 269/71 |

(Continued)

Primary Examiner — George Nguyen
(74) Attorney, Agent, or Firm — The Webb Law Firm

(57) ABSTRACT

Disclosed is a multi-axis workpiece manipulator or positioning device (10) having movement along two rectilinear axes (L1 and L2), two pivotable or tilt axes (T1 and T2) and two rotational axes (R1 and R2). The positioning device (10) includes a support base (12), a first member (18) attached to the support base (12) extending axially therefrom and a carriage (24) adjustably connected to the first member (18). The support base (12) is movable in a longitudinal path along a first rectilinear axis (L1) and the carriage is movable along the first member (18) in a vertical path along a second rectilinear axis (L2). A second member (30) is pivotably and rotatably attached to the carriage (24) and extends axially away from the carriage (24). The second member (30) can pivotably move along a first tilt axis (T1) with respect to the carriage (24) and can rotate in a circular path along a first rotational axis (R1). A third member (40) is pivotably and rotatably attached to an end of the second member (30), wherein the third member (40) can pivotably move along a second tilt axis (T2) with respect to the second member (30) and can rotate in a circular path along a second rotational axis (R2). A drive mechanism (D) operates the positioning device (10) for selectively positioning a workpiece (W) to be processed. This device (10) is particularly useful in fabricating compressor impellers.

21 Claims, 5 Drawing Sheets

U.S. PATENT DOCUMENTS

| | | | |
|---|---|---|---|
| 4,317,560 A | | 3/1982 | Troyer |
| 4,402,234 A | | 9/1983 | Malarz |
| 4,568,070 A | * | 2/1986 | Severt .................... 269/60 |
| 4,653,739 A | | 3/1987 | Moore |
| 4,767,109 A | * | 8/1988 | Raketich ................ 269/61 |
| 4,805,829 A | * | 2/1989 | Pege et al. ............ 228/49.1 |
| 4,934,036 A | * | 6/1990 | Miyamoto .............. 29/281.4 |
| 5,267,483 A | * | 12/1993 | Torii et al. ............ 74/490.01 |
| 5,358,227 A | * | 10/1994 | Bennett et al. .......... 269/68 |
| 5,581,166 A | * | 12/1996 | Eismann et al. ...... 318/568.22 |
| 5,743,705 A | * | 4/1998 | Eissfeller .............. 414/749.1 |
| 5,802,698 A | * | 9/1998 | Fitzgerald et al. ........ 29/559 |
| 6,009,916 A | * | 1/2000 | Krumm .................... 139/54 |
| 6,305,678 B1 | * | 10/2001 | Hammersmith et al. ..... 269/71 |
| 6,546,616 B2 | * | 4/2003 | Radowick ................ 29/720 |
| 6,660,043 B2 | * | 12/2003 | Kajitani et al. .......... 623/64 |
| 7,192,018 B2 | * | 3/2007 | Omori et al. .............. 269/71 |
| 7,635,119 B1 | * | 12/2009 | Patel .......................... 269/73 |
| 7,638,000 B2 | * | 12/2009 | Clifford et al. .......... 118/323 |
| 7,695,238 B2 | * | 4/2010 | Heath ...................... 414/754 |
| 2003/0223844 A1 | | 12/2003 | Schiele |

* cited by examiner

POSITIONING DEVICE FOR THE FABRICATION OF COMPRESSOR IMPELLERS

BACKGROUND OF THE INVENTION

1. Field of the Invention

This invention relates to a workpiece positioning device and, more particularly, to a positioning device for the fabrication of compressor impellers.

2. Description of Related Art

Multi-axis workpiece positioning devices or manipulators have recently gained acceptance as a highly efficient apparatus for executing complex motions on relatively inaccessible areas in performing welding or cutting operations. In the fabrication of complex parts, which can encompass two-dimensional and three-dimensional part designs, the conventional two or three axes tilt-rotate positioner typically requires multiple setups and special fixturing in order to obtain proper joint positioning for welding of parts. This method relies heavily upon a highly skilled welder in order to achieve consistently high quality welds.

Recently, automatic or robotic welders have been used in conjunction with workpiece positioning devices to negotiate the workpiece in order to weld difficult part shapes. The complexity of the equipment associated with a robotic welder that can negotiate difficult part shapes is oftentimes cumbersome and expensive. Conventional multi-axis workpiece manipulators are disclosed in U.S. Pat. Nos. 4,402,234 and 3,665,148.

It is desirable to have a workpiece positioning device that has multi-axis capabilities for positioning a workpiece in the best possible orientation, thus enabling a torch, even one that is fixed in place, to be positioned to produce the most favorable angle between a torch centerline and a welding surface of the workpiece. This would result in the elimination of additional torch equipment required to negotiate difficult part shapes.

SUMMARY OF THE INVENTION

The present invention provides for a six-axis workpiece positioning device that is capable of fabricating three-dimensional workpieces, such as compressor impellers, with greater efficiency, quality and performance. The positioning device provides for movement of a workpiece along two rectilinear axes, two pivotable or tilt axes and two rotational axes. The positioning device can be used in conjunction with a manual arc welding process or integrated within a robotic welding cell.

The positioning device of the present invention preferably includes a support base, a first member attached to the support base and extending axially therefrom and a carriage adjustably connected to the first member. The support base is movable in a longitudinal path along a first rectilinear axis and the carriage is movable along the first member in a vertical path along a second rectilinear axis. A second member is pivotably and rotatably attached to the carriage and extends axially away from the carriage. The second member can pivotably move along a first tilt axis with respect to the carriage and can rotate in a circular path along a first rotational axis. A third member is pivotably and rotatably attached to an end of the second member, wherein the third member can pivotably move along a second tilt axis with respect to the second member and can rotate in a circular path along a second rotational axis. A drive mechanism operates the positioning device for selectively positioning a workpiece to be processed.

DETAILED DESCRIPTION OF THE INVENTION

Figure 1:
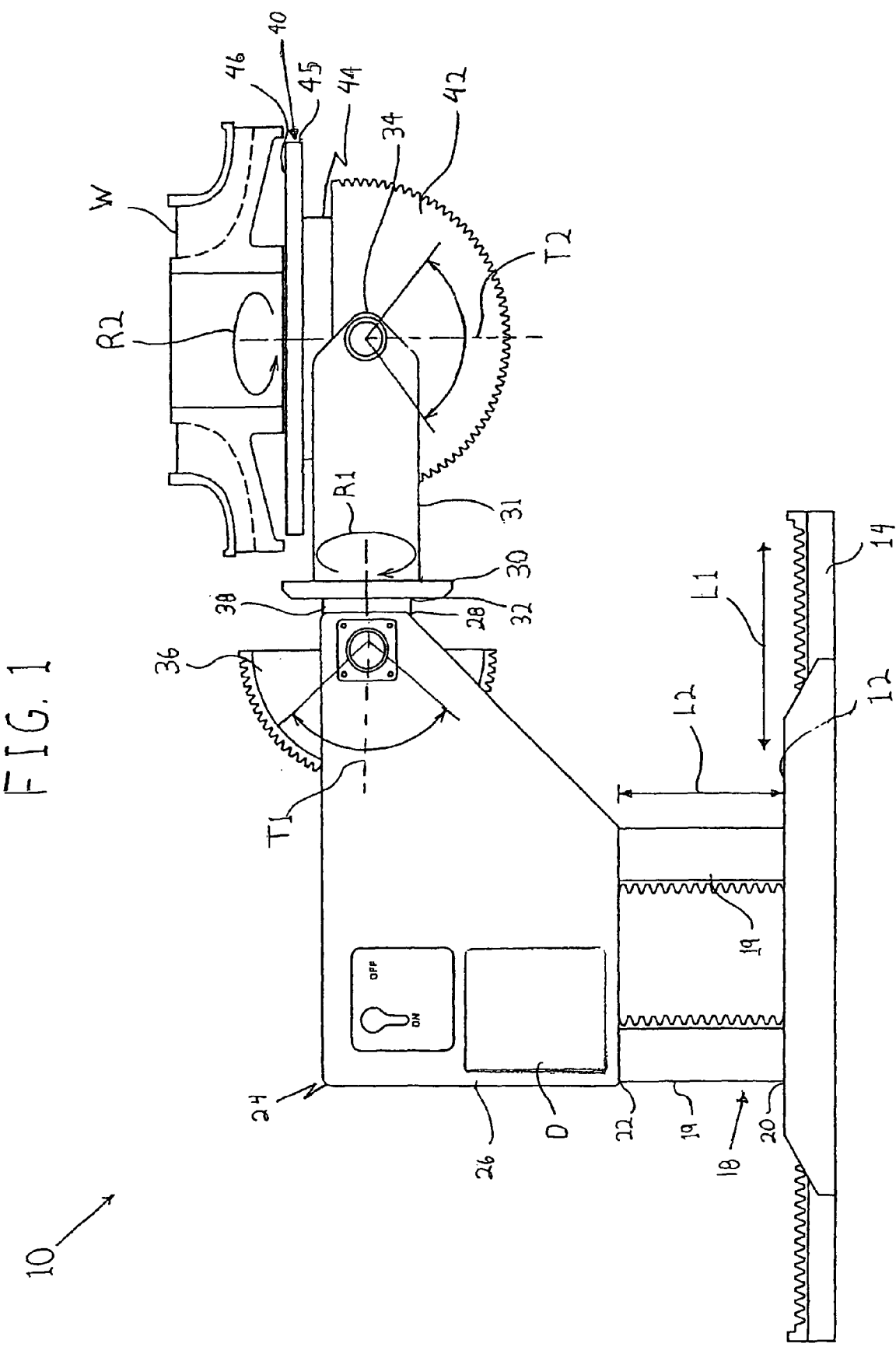
FIG. 1 is a side elevational view of a first embodiment of a positioning device made in accordance with the present invention and having a workpiece mounted thereon.
Figure 2:
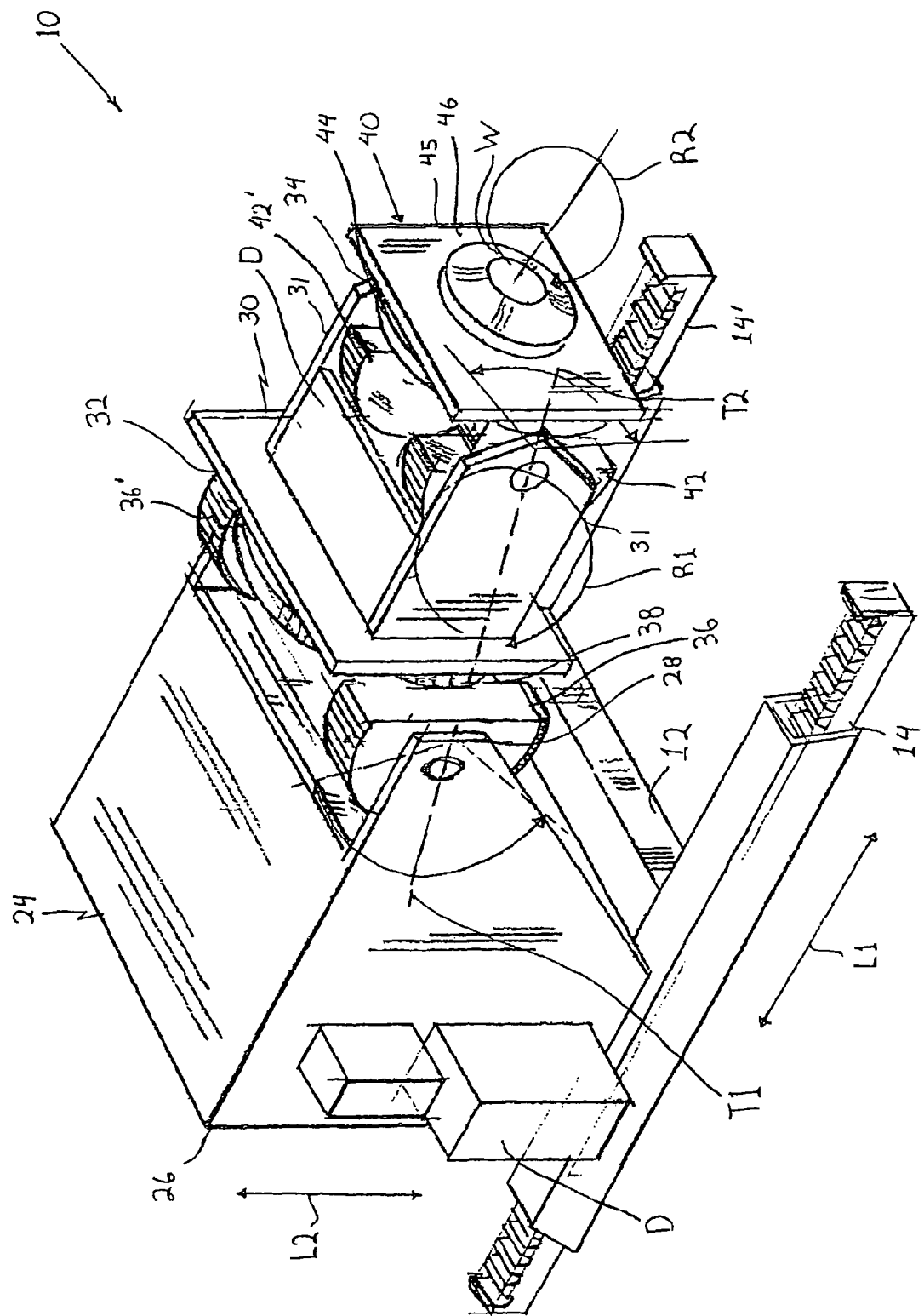
FIG. 2 is a perspective view of a second embodiment of a positioning device made in accordance with the present invention.

FIG. 1 shows a first embodiment of a six-axis manipulator or workpiece positioning device 10 in accordance with the present invention. FIG. 2 shows a second embodiment of the positioning device 10' that is similar to positioning device 10, except for the differences noted below. Like reference numerals are used for like parts. Referring to FIG. 1, the positioning device 10 includes a support base 12 having a guide member 14, wherein the support base 12 is movable along the guide member 14 in a longitudinal path along a first rectilinear axis as represented by arrow L1. FIG. 2 shows the positioning device 10' having a pair of guide members 14, 14', wherein the support base 12 is movable therealong. A first member 18 having a first end 20 and a second end 22 is attached to the support base 12 at the first end 20, wherein the first member 18 extends axially away from the support base 12. Depending on the size and load capacity of the positioning device 10, the first member 18 can include a pair of spaced apart vertical arms 19 (shown in FIG. 1) or a plurality of vertical arms 19 arranged in a box-shape attached to the support base 12 (second pair of vertical arms 19 on opposite side not shown). A chassis or carriage 24 having a rear end 26 and a forward end 28 is supported on the vertical arms 19, wherein the carriage 24 can move in a vertical path between the first end 20 and the second end 22 of the first member 18 along a second rectilinear axis L2 (i.e., height adjustment). The carriage 24 can be box-shaped as shown in FIG. 2.

Figure 3:
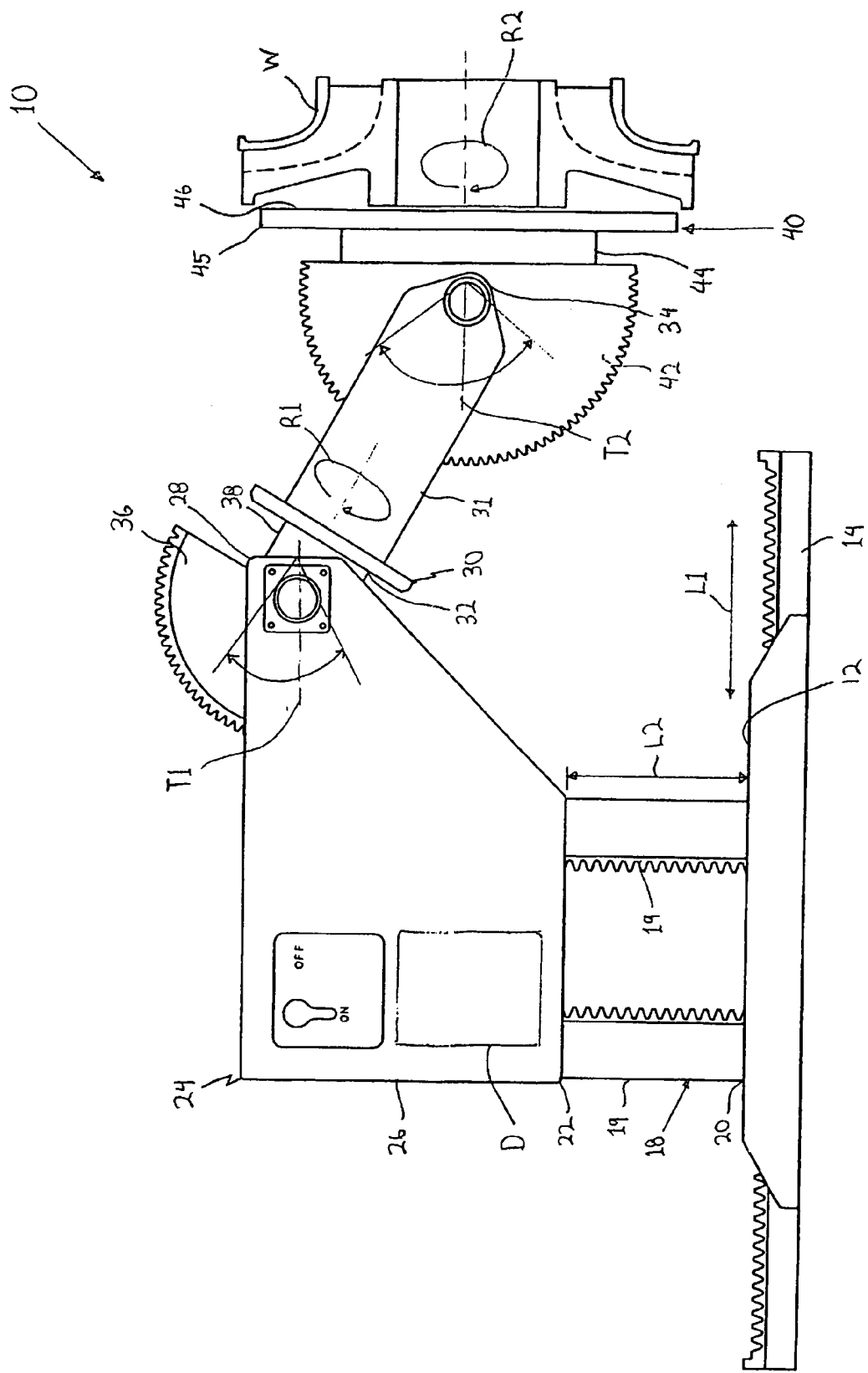
FIG. 3 is a side elevational view of the positioning device shown in FIG. 1 tilted downward with respect to a first tilt axis.
Figure 4:
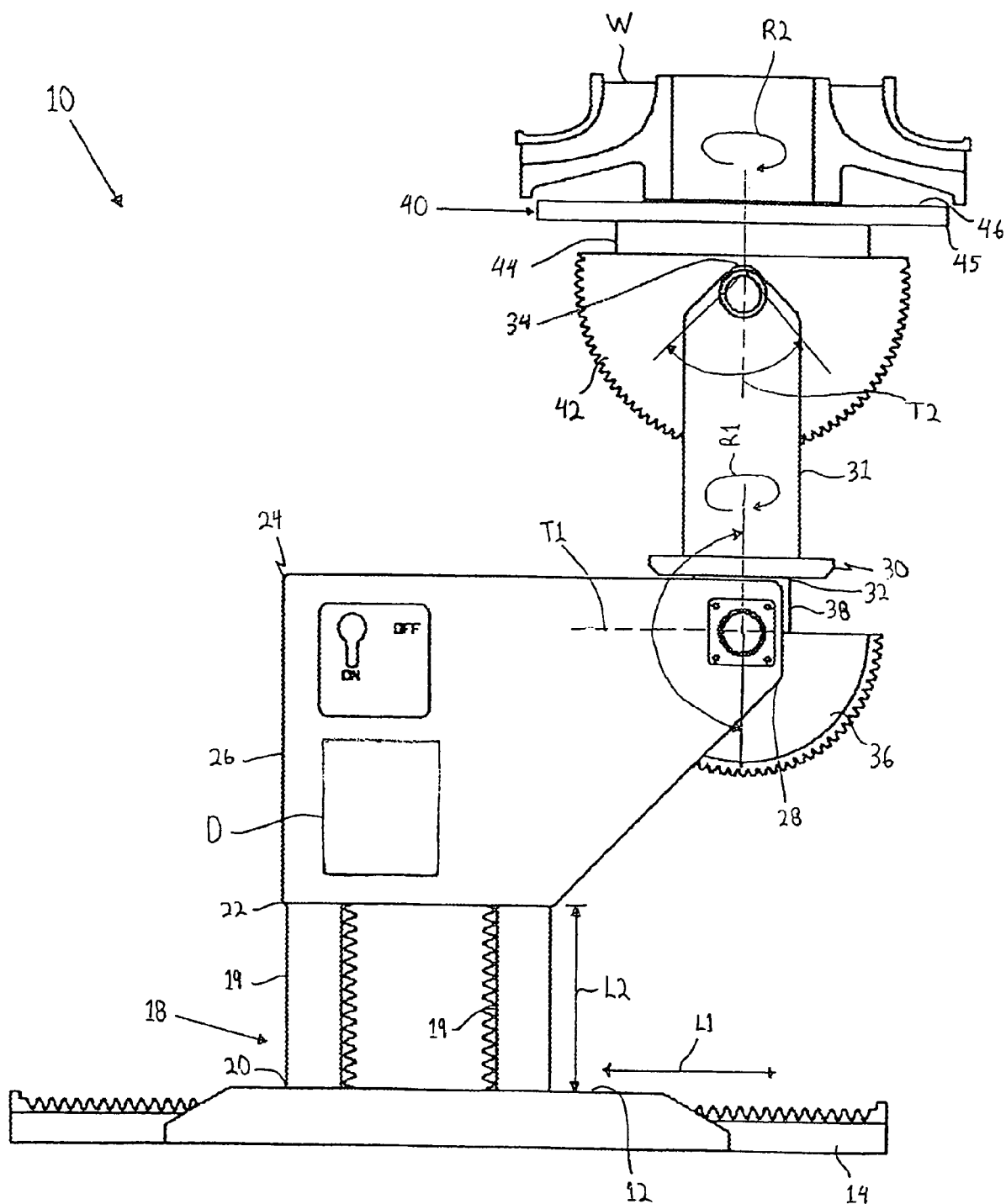
FIG. 4 is a side elevational view of the positioning device shown in FIG. 1 tilted 90 degrees upward with respect to a first tilt axis.

Referring to FIGS. 1 and 2, the positioning device 10 or 10' includes a second member 30 having a first end 32 and a second end 34 pivotably and rotatably attached to the forward end 28 of the carriage 24. The second member 30 can include a pair of spaced apart horizontal booms 31 extending axially away from the carriage 24 (shown in FIG. 2), wherein the second member 30 can pivot along a pivotable axis or a first tilt axis T1 and can rotate about a first rotational axis R1 in a circular path. The first end 32 of the second member 30 includes a first gear 36 pivotably attached to the forward end 28 of the carriage 24. A first turntable 38 is rotatably attached to the first gear 36, which is attached to the horizontal booms 31, wherein rotation of the first gear 36 allows the first turntable 38 and the horizontal booms 31 to tilt upward and downward with respect to the first tilt axis T1 as shown in FIGS. 3 and 4. The second member 30 can tilt in a range from 0 to 90° with respect to the first tilt axis T1. The first turntable 38 provides for 360° rotation of the horizontal booms 31 about a first rotational axis R1. A typical drive mechanism D used to drive the positioning device 10 and 10', such as a gear drive, is well known in the art and can be housed in the carriage 24 and between the horizontal booms 31 of the second member 30 (shown in FIG. 2). Referring to FIG. 2, the positioning device 10' can have a pair of first gears 36, 36' attached to the forward end 28 of the carriage 24, wherein the first turntable 38 can be positioned between each of the first gears 36, 36'.

Referring to FIG. 1, a third member or workhead 40 for supporting a workpiece W is pivotably and rotatably attached to the second end 34 of the second member 30 for pivotable movement along a second tilt axis T2 and for circumferential movement about a second rotational axis R2 in a circular path. The third member 40 includes a second gear 42 positioned between the horizontal booms 31 and pivotably attached to the second end 34 of the second member 30. A second turntable 44 is rotatably attached to the second gear 42 and a support plate 45 having a work surface 46 is attached to the second turntable 44. Rotation of the second gear 42 allows the second turntable 44 and the support plate 45 to tilt upward and downward with respect to a second tilt axis T2. The third member 40 can tilt in a range from 0 to 90° with respect to the second tilt axis T2 as shown in FIGS. 1 and 3. Rotation of the second turntable 44 provides for 360° rotation of the support plate 45 about a second rotational axis R2. Referring to FIG. 2, the positioning device 10' can be constructed such that a pair of second gears 42, 42' can be attached to the second end 34 of each of the horizontal booms 31 of the second member 30, wherein the second turntable 44 can be positioned between each of the second gears 42, 42'.

FIG. 3 shows the second member 30 of the positioning device 10 tilted approximately 30° downward with respect to the first tilt axis T1. FIG. 4 shows the second member 30 of the positioning device 10 tilted 90° upward with respect to the first tilt axis T1. FIG. 3 also shows the third member 40 tilted approximately 30° upward with respect to the second tilt axis T2 and FIG. 1 shows the third member 40 tilted 90° upward with respect to the second tilt axis T2.

With continued reference to FIG. 1, a workpiece W, such as a compressor impeller, can be supported on the work surface 46 of the support plate 45 of the third member 40. A holding device, such as a clamp (not shown), can be used to hold the workpiece W onto the work surface 46 of the support plate 45.

The attachment of the first gears 36, 36' to the carriage 24 and the second gears 42, 42' to the horizontal booms 31 can be accomplished via any conventional mechanical means such as the use of pivot pins. The drive mechanism D of the positioning device 10, 10' can provide for powered tilt and rotating table motions along with powered height adjustment and base adjustment.

Figure 5:
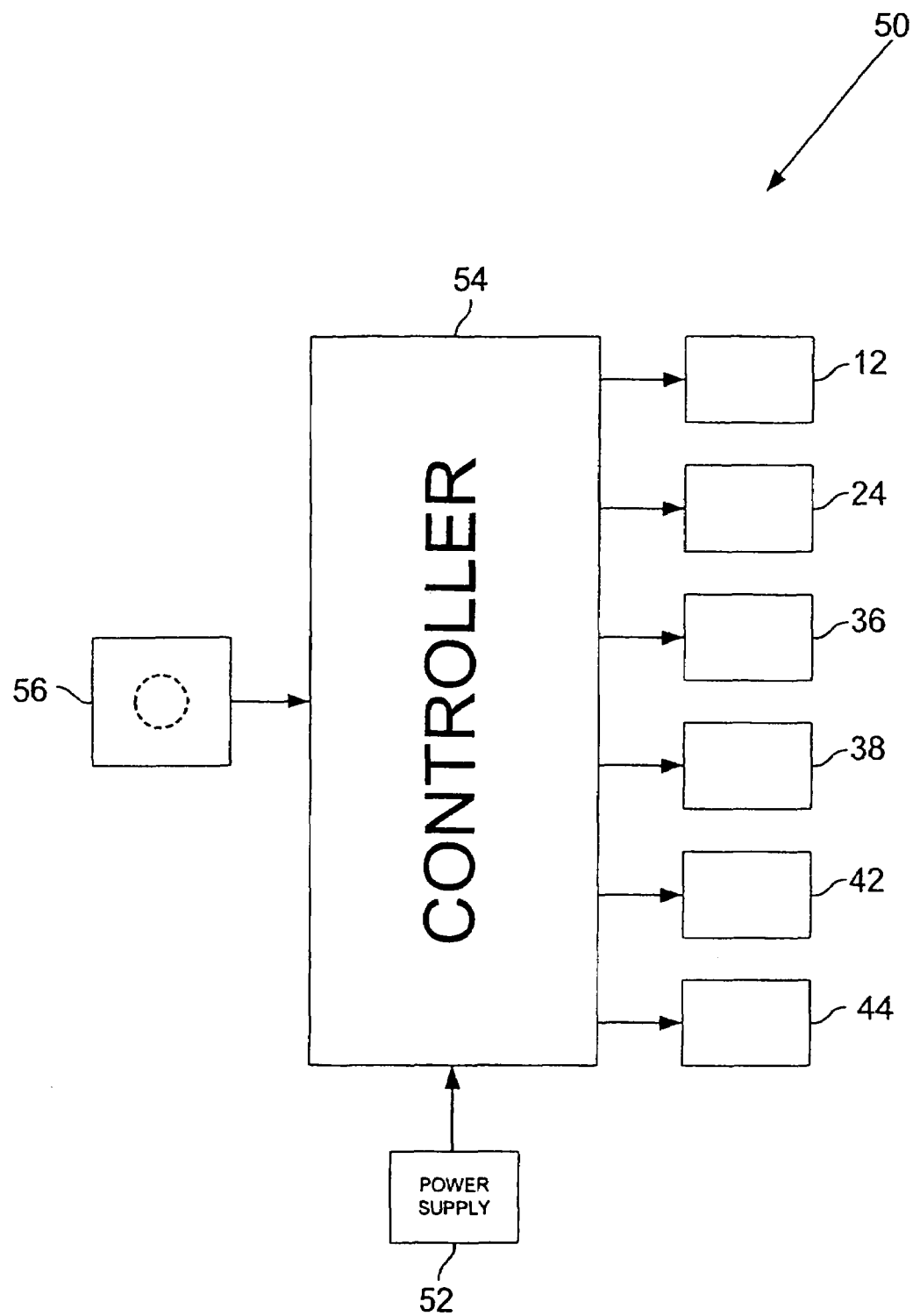
FIG. 5 is a block diagram of a control mechanism for the positioning device shown in FIGS. 1 and 2.

FIG. 5 shows a control mechanism 50 for the positioning device 10 or 10', wherein a workpiece W is positioned for processing such as fabrication, welding or cutting operations. The control mechanism 50 includes a power supply 52, a controller 54 and a selector 56 for selectively activating the various components of the positioning device 10. In operation, the workpiece W is secured to the surface 46 of the support plate 45 of the third member 40. Next, power is supplied to the controller 54 from the power supply 52. The selector 56, such as a selector switch, is activated thereby causing the controller 54 to selectively activate the drive mechanism for either the support base 12, the carriage 24, the first gear 36, the first turntable 38, the second gear 42 or the second turntable 44 simultaneously or one at a time for positioning the workpiece W in a desired position. Activation of the drive mechanism D for the support base 12 provides for movement of the support base 12 in a horizontal direction along a first rectilinear axis L1. Activation of the drive mechanism D for the carriage 24 provides for movement of the carriage 24 in a vertical direction along a second rectilinear axis L2 (i.e., vertical adjustment). Activation of the drive mechanism D for the first gear 36 and the second gear 42 provides for pivotable movement of the workpiece W along tilt axes T1 and T2, respectively. Activation of the drive mechanism D for the first turntable 38 and the second turntable 44 provides for 360° rotational movement of the workpiece W about rotational axes R1 and R2, respectively. The controller 54 can also be a programmable controller for automatic operation with respect to a robotic welder or a fixed welder (not shown). Further, adjustment of the positioning device 10 or 10' can also be done manually, particularly for longitudinal movement of the support base 12 and vertical movement of the carriage 24.

The positioning device 10 or 10', which provides for movement of a workpiece along two rectilinear axes L1 and L2, two tilt axes T1 and T2 and two rotational axes R1 and R2, can position a workpiece W in any conceivable position to produce the most favorable angle between a torch centerline and a welding surface of the workpiece W. The positioning device 10 or 10' is also more compact than the prior art multi-axes positioners, thereby occupying less overall space when performing welding or cutting operations.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:
1. A workpiece positioning device comprising:
a support base movable in a longitudinal path along a first rectilinear axis;
a first member attached to said support base, wherein said first member extends axially away from said support base;
a carriage adjustably connected to said first member, said carriage movable along said first member in a vertical path along a second rectilinear axis;
a second member pivotably and rotatably attached to said carriage, wherein said second member extends axially away from said carriage;
a third member pivotably and rotatably attached to an end of said second member, said third member adapted to support a workpiece, and
a drive mechanism for operating the positioning device and for selectively positioning a workpiece to be processed, wherein said second member has a first end and a second end and is pivotably and rotatably attached to said carriage at said first end of said second member, with said first end of said second member pivotably movable along a first tilt axis with respect to said carriage, and with said second member rotatable in a circular path along a first rotational axis, and
wherein said second member comprises a pair of spaced apart horizontal booms, a first turntable attached to said horizontal booms and a first gear rotatably attached to said first turntable at said first end of said second member, wherein said first gear is pivotably attached to said carriage.

2. The positioning device as claimed in claim 1, wherein said support base comprises at least one guide member, with said support base movable along said guide member.

3. The positioning device as claimed in claim 1, wherein said first member has a first end and a second end and is formed of a plurality of spaced apart vertical arms attached to said support base, with said carriage supported on said vertical arms and movable from said first end to said second end of said first member.

4. The positioning device as claimed in claim 1, wherein said third member is pivotably and rotatably attached to said second end of said second member, with said third member pivotably movable along a second tilt axis with respect to said second end of said second member, and with said third member rotatable in a circular path along a second rotational axis.

5. The positioning device as claimed in claim 1, wherein said second member comprises a pair of spaced apart first gears, with said first turntable positioned between said first gears.

6. The positioning device as claimed in claim 4, wherein said third member comprises a support plate, a second turntable attached to said support plate and a second gear rotatably attached to said second turntable, wherein said second gear is pivotably attached to said second end of said second member.

7. The positioning device as claimed in claim 6, wherein said third member comprises a pair of spaced apart second gears, with said second turntable positioned between said second gears.

8. The positioning device as claimed in claim 1, wherein said carriage is box-shaped.

9. A multi-axes manipulator for processing impellers comprising:
   a support base having a guide member, said support base moveable along said guide member in a longitudinal path along a first rectilinear axis;
   a plurality of vertical arms attached to said support base and extending axially therefrom;
   a carriage supported on said vertical arms, said carriage moveable along said vertical arms in a vertical path along a second rectilinear axis;
   a pair of spaced apart horizontal booms pivotably and rotatably attached to said carriage, said horizontal booms extending axially away from said carriage, with said horizontal booms pivotably moveable along a first tilt axis with respect to said carriage, and with said horizontal booms rotatable in a circular path along a first rotational axis;
   a workhead adapted to support an impeller, said workhead pivotably and rotatably attached to one end of said horizontal booms, with said workhead pivotably moveable along a second tilt axis with respect to the end of said horizontal booms, and with said workhead rotatable in a circular path along a second rotational axis; and
   a drive mechanism for operating the manipulator and for selectively positioning an impeller to be processed,
   wherein said horizontal booms have a first end and a second end, a first turntable attached to said first end of said horizontal booms and a pair of spaced apart first gears rotatably attached to said first turntable, with said first turntable positioned between said first gears, wherein said first gears are pivotably attached to said carriage.

10. The positioning device as claimed in claim 9, wherein said workhead comprises a support plate, a second turntable attached to said support plate and a pair of spaced apart second gears rotatably attached to said second turntable, with said second turntable positioned between said second gears, wherein said second gears are pivotably attached to said second end of said horizontal booms.

11. The positioning device as claimed in claim 9, wherein said carriage is box-shaped.

12. A multi-axes manipulator for processing impellers comprising:
   a support base having a guide member, said support base moveable along said guide member in a longitudinal path along a first rectilinear axis;
   a pair of vertical arms attached to said support base and extending axially therefrom;
   a carriage supported on said vertical arms, said carriage moveable along said vertical arms in a vertical path along a second rectilinear axis;
   a horizontal boom pivotably and rotatably attached to said carriage, said horizontal boom extending axially away from said carriage, with said horizontal boom pivotably moveable along a first tilt axis with respect to said carriage, and with said horizontal boom rotatable in a circular path along a first rotational axis;
   a workhead adapted to support an impeller, said workhead pivotably and rotatably attached to one end of said horizontal boom, with said workhead pivotably moveable along a second tilt axis with respect to the end of said horizontal boom, and with said workhead rotatable in a circular path along a second rotational axis; and
   a drive mechanism for operating the manipulator and for selectively positioning an impeller to be processed,
   wherein said horizontal boom has a first end and a second end, a first turntable attached to said first end of said horizontal boom and a first gear rotatably attached to said first turntable, wherein said first gear is pivotably attached to said carriage.

13. The positioning device as claimed in claim 12, wherein said workhead comprises a support plate, a second turntable attached to said support plate and a second gear rotatably attached to said second turntable, wherein said second gear is pivotably attached to said second end of said horizontal boom.

14. The positioning device as claimed in claim 12, wherein said carriage is box-shaped.

15. A workpiece positioning device comprising:
   a support base movable in a longitudinal path along a first rectilinear axis;
   a first member attached to said support base, wherein said first member extends axially away from said support base;
   a carriage adjustably connected to said first member, said carriage movable along said first member in a vertical path along a second rectilinear axis;
   a second member pivotably and rotatably attached to said carriage, wherein said second member extends axially away from said carriage;
   a third member pivotably and rotatably attached to an end of said second member, said third member adapted to support a workpiece, and
   a drive mechanism for operating the positioning device and for selectively positioning a workpiece to be processed
   wherein said second member has a first end and a second end and is pivotably and rotatably attached to said carriage at said first end of said second member, with said first end of said second member pivotably movable along a first tilt axis with respect to said carriage, and with said second member rotatable in a circular path along a first rotational axis,
   wherein said third member is pivotably and rotatably attached to said second end of said second member, with said third member pivotably movable along a second tilt axis with respect to said second end of said second member, and with said third member rotatable in a circular path along a second rotational axis, and wherein said third member comprises a support plate, a second turntable attached to said support plate and a second gear rotatably attached to said second turntable, wherein said second gear is pivotably attached to said second end of said second member.

16. The positioning device as claimed in claim 15, wherein said support base comprises at least one guide member, with said support base movable along said guide member.

17. The positioning device as claimed in claim 15, wherein said first member has a first end and a second end and is formed of a plurality of spaced apart vertical arms attached to said support base, with said carriage supported on said vertical arms and movable from said first end to said second end of said first member.

18. The positioning device as claimed in claim 15, wherein said second member comprises a pair of spaced apart horizontal booms, a first turntable attached to said horizontal booms and a first gear rotatably attached to said first turntable at said first end of said second member, wherein said first gear is pivotably attached to said carriage.

19. The positioning device as claimed in claim 18, wherein said second member comprises a pair of spaced apart first gears, with said first turntable positioned between said first gears.

20. The positioning device as claimed in claim 15, wherein said third member comprises a pair of spaced apart second gears, with said second turntable positioned between said second gears.

21. The positioning device as claimed in claim 15, wherein said carriage is box-shaped.

\* \* \* \* \*